United States Patent
Lee et al.

(10) Patent No.: US 7,489,605 B2
(45) Date of Patent: Feb. 10, 2009

(54) METHOD AND APPARATUS OF REPRODUCING DATA FROM AN INFORMATION STORAGE MEDIUM

(75) Inventors: Kyung-geun Lee, Seongnam-si (KR); Yong-jin Ahn, Seoul (KR); Wook-yeon Hwang, Yangpyung-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 11/205,008

(22) Filed: Aug. 17, 2005

(65) Prior Publication Data

US 2005/0276188 A1 Dec. 15, 2005

Related U.S. Application Data

(63) Continuation of application No. 11/005,099, filed on Dec. 7, 2004, now Pat. No. 7,385,891.

(30) Foreign Application Priority Data

| Mar. 3, 2004 | (KR) | ................ 2004-14378 |
| Apr. 21, 2004 | (KR) | ................ 2004-27575 |
| Jun. 12, 2004 | (KR) | ................ 2004-43333 |

(51) Int. Cl.
*G11B 15/52* (2006.01)
(52) U.S. Cl. ........................... 369/47.5; 369/94
(58) Field of Classification Search ............... None
See application file for complete search history.

(56) References Cited

U.S. PATENT DOCUMENTS

| 2002/0136122 A1* | 9/2002 | Nakano ................ 369/47.53 |
| 2003/0137909 A1* | 7/2003 | Ito et al. .............. 369/47.14 |
| 2003/0137910 A1 | 7/2003 | Ueda et al. |

(Continued)

FOREIGN PATENT DOCUMENTS

CN 1447968 10/2003

(Continued)

OTHER PUBLICATIONS

Office Action issued Jan. 9, 2006 by the Korean Intellectual Property Office re: Korean Patent Application No. 2004-43333.

(Continued)

*Primary Examiner*—Paul Huber
(74) *Attorney, Agent, or Firm*—Stein, McEwen & Bui, LLP

(57) ABSTRACT

An information storage medium on which data is recorded after performing optimum power control (OPC) and a method and apparatus to record/reproduce data on/from the information storage medium, wherein the recordable information storage medium has a plurality of recording layers and a pickup irradiates a beam onto the information storage medium, utilize operations of: recording data on at least a portion of a recording layer through which a test beam to find an optimum recording power passes before performing optimum power control (OPC) on a desired recording layer and performing OPC on the desired recording layer. The method and apparatus allow data to be recorded after performing a test to determine an optimum recording power, thus providing effective recording/reproducing quality.

17 Claims, 5 Drawing Sheets

U.S. PATENT DOCUMENTS

| | | | |
|---|---|---|---|
| 2003/0151994 A1 | 8/2003 | Tasaka et al. | |
| 2003/0185121 A1 | 10/2003 | Narumi et al. | |
| 2004/0052176 A1 | 3/2004 | Narumi et al. | |
| 2005/0226116 A1* | 10/2005 | Kubo et al. | 369/47.53 |

FOREIGN PATENT DOCUMENTS

| | | |
|---|---|---|
| EP | 1 318 509 | 6/2008 |
| JP | 03-157816 | 7/1991 |
| JP | 2000-311346 | 11/2000 |
| JP | 2003-323769 | 11/2003 |
| JP | 2004-046966 | 2/2004 |
| KR | 2003-97633 | 12/2003 |
| WO | WO 02/23542 | 3/2002 |

OTHER PUBLICATIONS

U.S. Appl. No. 11/005,099, filed Dec. 7, 2004, Kyung-geun Lee et al., Samsung Electronics Co., Ltd.
U.S. Appl. No. 11/431,006, filed May 10, 2006, Kyung-geun Lee et al., Samsung Electronics Co., Ltd.
U.S. Appl. No. 11/431,005, filed May 10, 2006, Kyung-geun Lee et al., Samsung Electronics Co., Ltd.
U.S. Appl. No. 11/430,876, filed May 10, 2006, Kyung-geun Lee et al., Samsung Electronics Co., Ltd.
Office Action issued on Mar. 9, 2007 by the Chinese Intellectual Property Office for Chinese Patent Application No. 2005800003916.
European Search Report dated Jun. 4, 2008 of the European Application No. 05726936.7.

* cited by examiner

INNER CIRCUMFERENCE

OUTER CIRCUMFERENCE

INNER CIRCUMFERENCE

OUTER CIRCUMFERENCE

METHOD AND APPARATUS OF REPRODUCING DATA FROM AN INFORMATION STORAGE MEDIUM

CROSS-REFERENCE TO RELATED APPLICATIONS

This application is a continuation application of U.S. patent application Ser. No. 11/005,099, filed Dec. 7, 2004, now U.S. Pat. No. 7,385,891, which claims the priorities of Korean Patent Application No. 2004-14378, filed on Mar. 3, 2004 in the Korean Intellectual Property Office, Korean Patent Application No. 2004-27575, filed on Apr. 21, 2004 in the Korean Intellectual Property Office, and Korean Patent Application No. 2004-43333, filed on Jun. 12, 2004 in the Korean Intellectual Property Office, the disclosures of which are incorporated herein in their entireties by reference.

BACKGROUND OF THE INVENTION

1. Field of the Invention

The present invention relates to an information storage medium and a method and apparatus to record/reproduce data on/from the information storage medium, and more particularly, to a method and apparatus to record/reproduce data on/from an information storage medium having a plurality of recording layers after performing optimum power control (OPC).

2. Description of the Related Art

An optical pickup performs non-contact recording/reproducing to/from an information storage medium. Optical disks that are one type of information storage media are classified into compact disks (CDs) and digital versatile disks (DVDs) depending on data recording capacity. Examples of optical disks capable of writing and reading information include CD-Recordable (CD-R), CD-Rewritable (CD-RW), and 4.7 GB DVD+RW. Furthermore, a high Definition-DVD (HD-DVD) or blu-ray disk (BD) with recording capacity of over 15 GB and a super-resolution optical disk that may read data recorded in a pattern of marks below the resolution limit are currently being developed.

While only single layer 4.7 GB DVD-Recordable disks are commercially available, dual layer 8.5 GB DVD-ROM disks are being sold in the market. To back up data recorded on the 8.5 GB DVD-ROM disk, a DVD recordable disk with the same capacity is required. Thus, to realize a need for a recordable disk having at least first and second recording layers, it is highly desirable to have techniques for maintaining the same recording/reproducing characteristics on a recordable information storage medium having a plurality of recording layers. One of the most important recording/reproducing characteristics is called optimum power control (OPC).

SUMMARY OF THE INVENTION

The present invention provides a method and apparatus to record/reproduce data on a recordable information storage medium having a plurality of recording layers after performing optimum power control (OPC) and an information storage medium to which data is written by the method.

According to an aspect of the present invention, a method records/reproduces data on/from a recordable information storage medium having a plurality of recording layers using a pickup. The method includes recording data on at least a portion of a recording layer through which a test beam for finding the optimum recording power passes before performing optimum power control (OPC) on a desired recording layer and performing OPC on the desired recording layer. The portion of the recording layer corresponds to tracks contained in the test beam.

Where SL, TP, NA, and n denote the thickness of a spacer layer between the plurality of recording layers, a track pitch, a numerical aperture of an objective lens, and a refractive index of the information storage medium, respectively, a number of tracks is determined using the following equation:

$$\text{Number of Tracks} = \frac{2SL\tan\left[\sin^{-1}\left(\frac{NA}{n}\right)\right]}{TP}$$

Data may be recorded in an order of recording layers from closest to farthest from the pickup.

When the plurality of recording layers include first and second recording layers and the first recording layer is located closer to the pickup, data may be recorded on a portion of the first recording layer through which the test beam passes before performing OPC on the second recording layer.

At least one of jitter, asymmetry, degree of modulation, or reflectivity is recorded on each recording layer.

According to another aspect of the present invention, an information storage medium comprises first and second recording layers, either containing a lead-in area, a user data area, and a lead-out area, wherein data is recorded from the first recording layer to the second recording layer. In the information storage medium, the first and second recording layers respectively include OPC areas. Data is recorded on the inner or outer circumference of the OPC area in the first recording layer, and OPC is performed on a region of the OPC area in the second recording layer disposed opposite the region on which data is recorded to determine an optimum recording power.

In another embodiment of the present invention, a recordable information storage medium comprises a plurality of recording layers, wherein OPC information is stored indicating whether data has been written on a portion of a recording layer through which a test beam passes to determine an optimum recording power for recording on a desired recording layer. In this case, the recording layers have an OPC area and the OPC information contains information indicating whether data has been written on inner or outer circumference of the OPC area. Each of the plurality of recording layers includes a lead-in area, a user data area, and a lead-out area, and the OPC information is recorded on at least one of the lead-in area and the lead-out area. The lead-in area contains a read-only region and a recordable region, and the OPC information is recorded on the recordable region.

According to another aspect of the present invention, an apparatus records/reproduces data on/from a recordable information storage medium including a plurality of recording layers. The apparatus includes: a pickup irradiating a beam onto the information storage medium; a recording/reproducing signal processor receiving a beam reflected from the information storage medium through the pickup for signal processing; and a controller detecting whether data has been recorded on a portion of a recording layer through which a test beam to determine an optimum recording power passes and performs optimum power control (OPC) on a desired recording layer for recording through the pickup.

In another embodiment, the present invention provides an apparatus to record/reproduce data on/from a recordable information storage medium including a plurality of recording layers wherein the apparatus includes a pickup irradiating a beam onto the information storage medium, a recording/reproducing signal processor receiving a beam reflected from the information storage medium through the pickup for signal processing, and a controller to read information indicating whether data has been recorded on a portion of a recording layer through which a test beam to determine optimum recording power passes and performs optimum power control (OPC) on a desired recording layer to record through the pickup using the information.

When data has not been recorded on the portion of the recording layer, a pickup is controlled to record data on the portion of the recording layer through which the test beam passes to determine an optimum recording power to record on the desired recording layer. Information indicating that data has been recorded on the portion of the recording layer through which the test beam passes may be recorded on the information storage medium.

The information storage medium contains information indicating optimum recording power conditions that may be applied when data is recorded on the portion of the recording layer through which the test beam passes and when data is not recorded on the same. When the data is not recorded on the portion of the recording layer, OPC is performed using the optimum recording power conditions instead of separately recording the data to find the optimum recording power.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
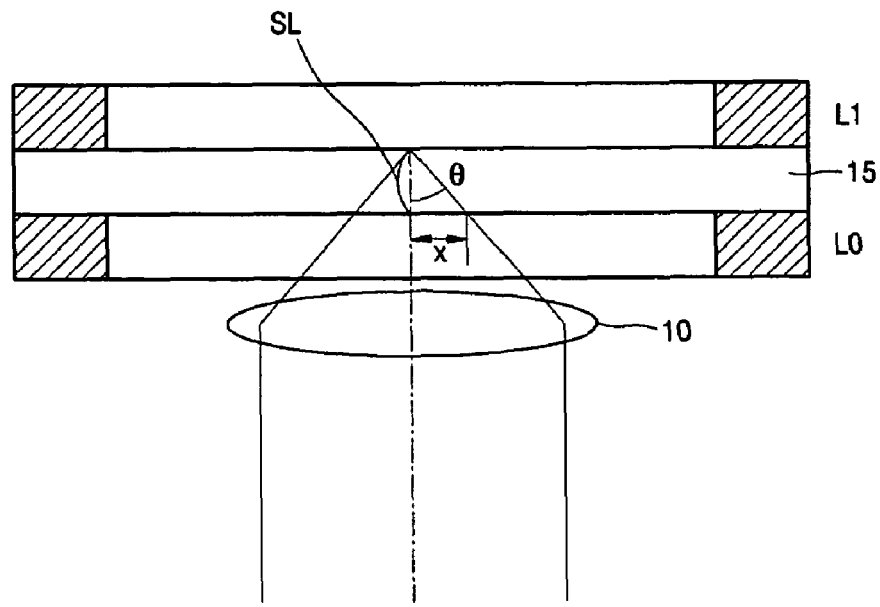
FIG. 1 illustrates a layout of a dual layer information storage medium to illustrate a method to record/reproduce data on/from the information storage medium according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A method to record/reproduce data on/from an information storage medium having a plurality of recording layers according to an embodiment of the present invention allows data to be prerecorded on a portion of another recording layer through which a beam passes when irradiating a target recording layer with the beam to find the optimum recording power.

A recordable information storage medium performs optimum power control (OPC) prior to recording data to determine an optimal recording power. To perform OPC, data is written in an OPC area at a predetermined recording power and read back to test the reproducing characteristics. Once the optimum recording power has been found during the test, data is recorded at the optimum recording power during each recording session.

When OPC is implemented in a recordable information storage medium having a plurality of recording layers, recording/reproducing characteristics exhibited after performing OPC may vary from one recording layer to another, for example, depending on the recording sequence or recording power. Since these variations may lead to inaccuracy in OPC, it is necessary to detect conditions that may cause recording/reproducing characteristics to change depending on the state of each recording layer and perform OPC considering the conditions.

To find conditions that affect the recording/reproducing characteristics, experiments were made to write data on an information storage medium of FIG. 1, wherein the information storage medium has first and second recording layers L1 and L2 in a different order and at different recording power levels.

Recording conditions of the information storage medium are a linear velocity of 3.8 m/s, laser wavelength of 650 nm, and objective lens numerical aperture (NA) of 0.60. The information storage medium uses multipulse write strategies. While a recording power of 15.1 mW, Ttop of 1.45 T, Tmp of 0.65 T, and Tdtp 3T of −0.03 T are used for the first recording layer L1, a recording power of 20 mW, Ttop of 1.65 T, Tmp of 0.70 T, Tdtp 3T of −0.03 T are used for the second recording layer L2. Ttop, Tmp, and Tdtp denote the duration of a top pulse, the duration of each pulse, and time shifted from a reference, respectively. Here, basic recording conditions are set as recording power and write strategy adjusted for minimum jitter by writing data only on a desired recording layer, and 1T denotes 38.5 ns.

Table 1 shows jitter, I3/I14 modulations, asymmetries, and reflectivities measured after writing data on the first and second recording layers L1 and L2 under the above-mentioned conditions. A pickup is located closer to the first recording layer L1, and reference numeral 10 denotes an objective lens.

TABLE 1

| Recording | First recording layer (L1) | | | | Second recording layer (L2) | | | | Recording state |
| --- | --- | --- | --- | --- | --- | --- | --- | --- | --- |
| | Jitter | I3/I14 | Asym. | Refl. | Jitter | I3/I14 | Asym. | Refl. | |
| L1 unrecorded, L2 recorded | 7.9% | 0.270 | 0.085 | 17.0% | 8.1% | 0.255 | 0.030 | 17.5% | L1 unrecorded, L2 recorded |
| Recording L2 after recording L1 | 8.0% | 0.250 | 0.098 | 16.8% | 8.3% | 0.240 | 0.023 | 18.9% | Recording L1 after recording L2 |
| Recording L1 after recording L2 | 8.1% | 0.267 | 0.091 | 16.5% | 8.9% | 0.244 | 0.060 | 18.8% | Recording L2 after recording L1 |

As is evident from Table 1, the first recording layer L1 maintains almost the same values of jitter, I3/I14, asymmetry (Asym.), and reflectivity (Refl.), regardless of the recording state or sequence while the second recording layer L2 exhibits varying characteristics depending on the recording sequence. That is, when data is written sequentially from the first recording layer L1 to the second recording layer L2, the second recording layer L2 suffers from significant variations in jitter, asymmetry, and reflectivity. When data is written in the reverse order, the second recording layer L2 suffers from less variations in such characteristics.

Table 2 shows recording/reproducing characteristics measured after data is written at recording powers that are 120% and 150% of the normal power. During OPC, a test is performed at different recording power levels to determine an optimum recording power value. In particular, since the information storage medium once used for a predetermined period of time may require a recording power higher than a normal power due to surface contamination, it is necessary to perform the test at a higher power.

recorded or unrecorded portion of a recording layer. Low transmittance reduces the effect of the recording power.

Meanwhile, it is necessary to perform a test under the conditions that cause significant variations in recording/reproducing characteristics. That is, if there is insignificant change in the recording/reproducing characteristics under any conditions, it is possible to find the accurate optimum recording power without any special test conditions for determining the same. However, if the recording/reproducing characteristics vary according to the recording conditions, a test needs to be performed under conditions that cause significant variations in the characteristics to determine the optimum recording power.

Thus, when a test beam is emitted to find the optimum recording power, generally, data has been written on at least a portion of a recording layer through which the test beam passes.

Figure 2:
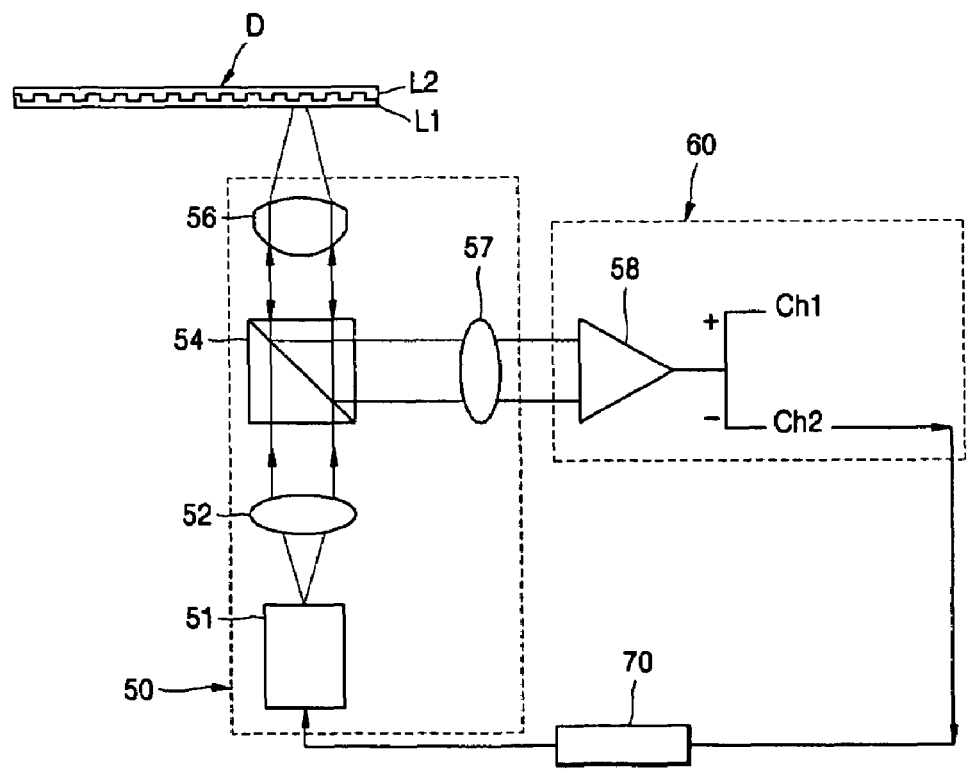
FIG. 2 is a schematic diagram of an apparatus to record/reproduce data on/from an information storage medium according to an embodiment of the present invention.

Referring to FIG. 2, an information storage medium D includes a first recording layer L1 and L2, and a pickup 50 to record data is disposed below the first recording layer L1.

TABLE 2

| Recording state | First recording layer (L1) | | | | Second recording layer (L2) | | | | Recording state |
| --- | --- | --- | --- | --- | --- | --- | --- | --- | --- |
| | Jitter | I3/I14 | Asym. | Refl. | Jitter | I3/I14 | Asym. | Refl. | |
| Recording L1 after recording L2 (120%) | 8.2% | 0.259 | 0.097 | 16.3% | 9.3% | 0.250 | 0.052 | 18.8% | Recording L2 after recording L1 |
| Recording L1 after recording L2 (150%) | 8.2% | 0.272 | 0.096 | 16.4% | 9.8% | 0.261 | 0.060 | 19.1% | Recording L2 after recording L1 |

As is evident from Table 2, while the first recording layer L1 exhibits almost the same recording/reproducing characteristics even at higher recording powers, the second recording layer L2 suffers from significant variations in reflectivity, asymmetry, and jitter when data is written sequentially on the first and second recording layers L1 and L2. As compared with recording at a normal power, the jitter increases, but reflectivity and asymmetry remain almost constant.

As may be seen in Tables 1 and 2 above, the first recording layer L1 is little affected by a recording sequence or a recording power, whereas the second recording layer L2 is significantly affected by the same. In particular, when data is written sequentially on the first and second recording layers L1 and L2, the second recording layer L2 suffers from significant variations in the recording/reproducing characteristics. Such variations result from transmittance that may change, depending on whether a recording beam passes through a Before a test beam is irradiated to perform OPC on the second recording layer L2, data is recorded on a portion of the first recording layer L1 through which the test beam passes. In this case, data may be recorded in an area corresponding to tracks contained in the beam irradiated on the first recording layer L1.

Referring to FIG. 1, the number of tracks contained in the portion of the first recording layer irradiated by the test beam is given by Equation (1):

$$\text{Number of Tracks} = \frac{2x}{TP} = \frac{2SL\tan\theta}{TP} \qquad (1)$$

where SL and TP denote the thickness of a space layer 15 between the first and second information storage layers L1 and L2 and a track pitch, respectively.

Where n is a refractive index of the information storage medium and NA is a numerical aperture of the objective lens 10, using the relational expression NA=n sin θ, Equation (1) is summarized as:

$$\text{Number of Tracks} = \frac{2SL\tan\left[\sin^{-1}\left(\frac{NA}{n}\right)\right]}{TP} \quad (2)$$

Data may be written on an area of the first recording layer L1 corresponding to the number of tracks defined by Equation (2) before irradiating a test beam for OPC onto the second recording layer L2.

Where SL tan θ=41.25(μm) and TP=0.74 μm, the number of tracks contained in the test beam is about 112.

In the case of a DVD-ROM drive, a pickup is disposed below a first recording layer and data is written from the first recording layer to the second recording layer. To maintain consistency with the DVD-ROM drive, the recordable information storage medium may be designed to allow data to be written from the first recording layer L1 to the second recording layer L2.

The same method to record/reproduce data according to an embodiment of the present invention may apply when the pickup is located above the second recording layer L2. In this case, data is first recorded on the second recording layer L2. Before performing OPC for recording on the first recording layer L1, data is recorded on at least a portion of the second recording layer L2 through which a test beam passes.

Furthermore, the method may be applied to both opposite track path (OTP) and parallel track path (PTP) disks. While the present invention has been described with reference to a dual layer information storage medium, the method may also apply to a multi-layer medium having three or more recording layers.

Figure 3:
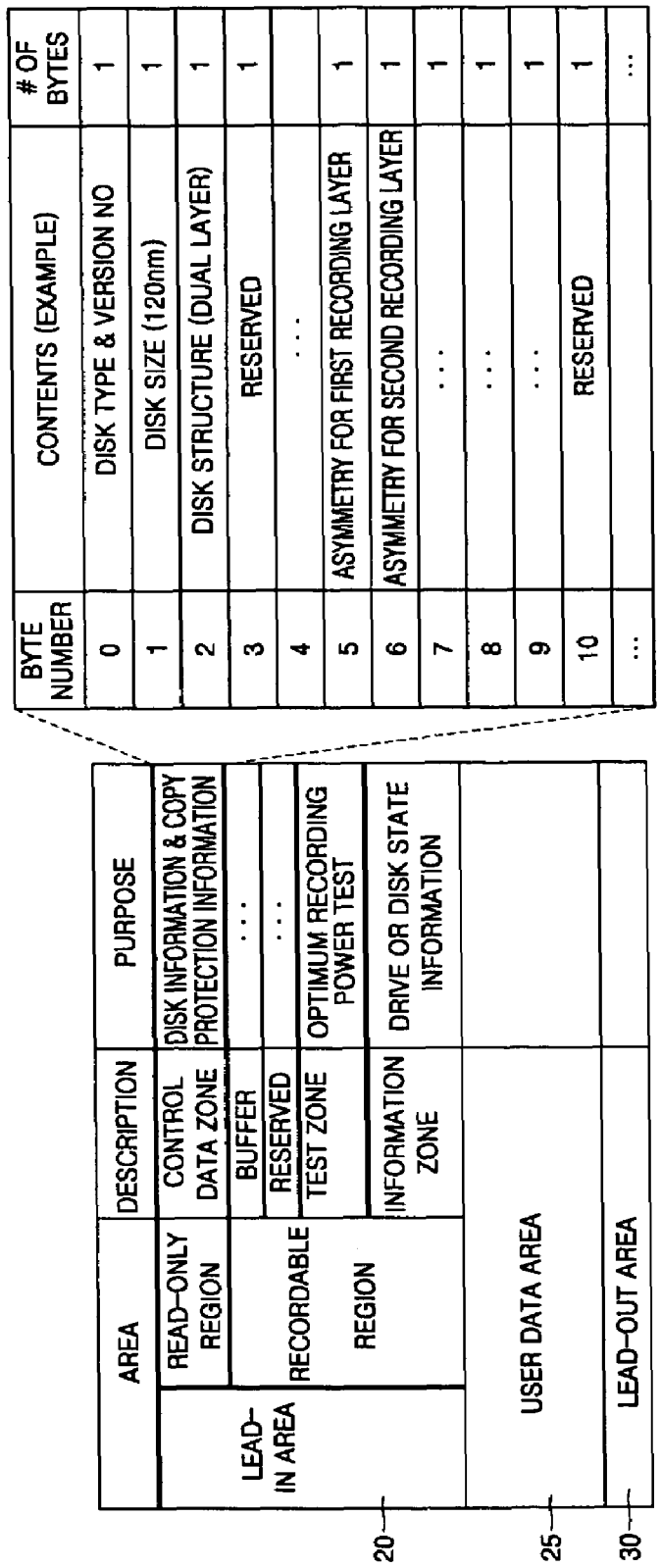
FIG. 3 illustrates a layout of an information storage medium according to an embodiment of the present invention.

Meanwhile, to obtain the optimum recording power, at least one of jitter, degree of modulation, asymmetry, and reflectivity for each recording layer is recorded on each recording layer. Referring to FIG. 3, an information storage medium according to an embodiment of the present invention includes a lead-in area 20, a user data area 25, and a lead-out area 30.

The lead-in area 20 is divided into a read-only region and a recordable region, and a control data zone in the read-only region contains disk related information and copy protection information, either of which may be used to perform OPC.

At least one of jitter, degree of modulation, asymmetry, or reflectivity for each recording layer is recorded in predetermined bytes in the control data zone. In particular, a recordable information storage medium may include asymmetry information. Asymmetry for the second recording layer may be measured after data is recorded on a portion of the first recording layer through which a beam passes when the beam is emitted from below the first recording layer.

When the material or the type of the information recording medium changes, control information such as asymmetry, degree of modulation, and jitter may be recorded together. The control information may be recorded on either or both of the lead-in and lead-out areas 20 and 30.

Figure 4:
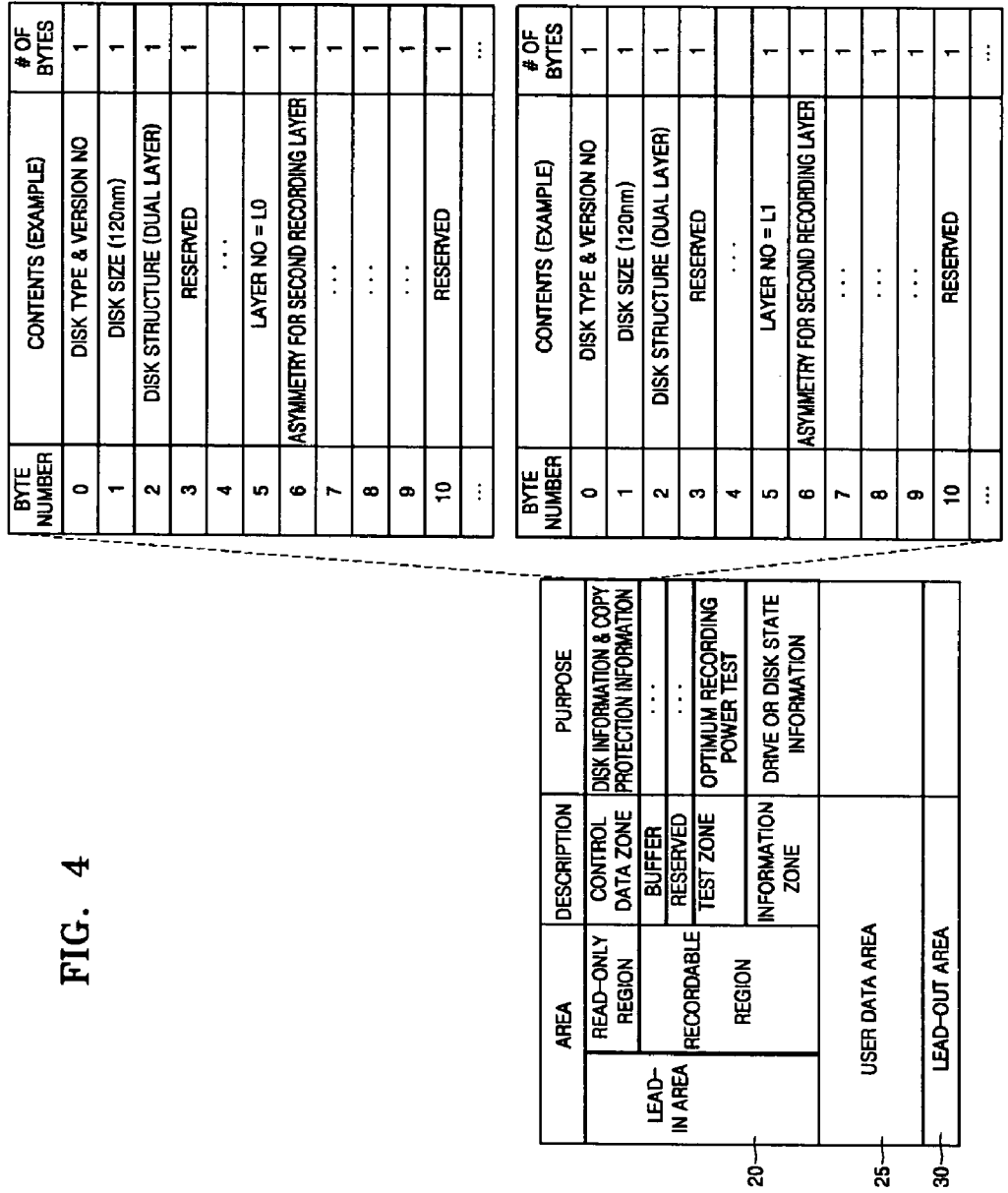
FIG. 4 illustrates another layout of an information storage medium on which disk related information has been recorded according to an embodiment of the present invention.

Alternatively, referring to FIG. 4, asymmetry information about first and second recording layers each may be recorded on a different space in the control data zone. In this case, while the asymmetry information about the first recording layer is recorded along with information representing layer number, i.e., the first recording layer, the asymmetry information concerning the second recording layer is recorded along with information representing the second recording layer. The disk related information may be recorded in the same way on both the first and second recording layers.

Figure 5A:
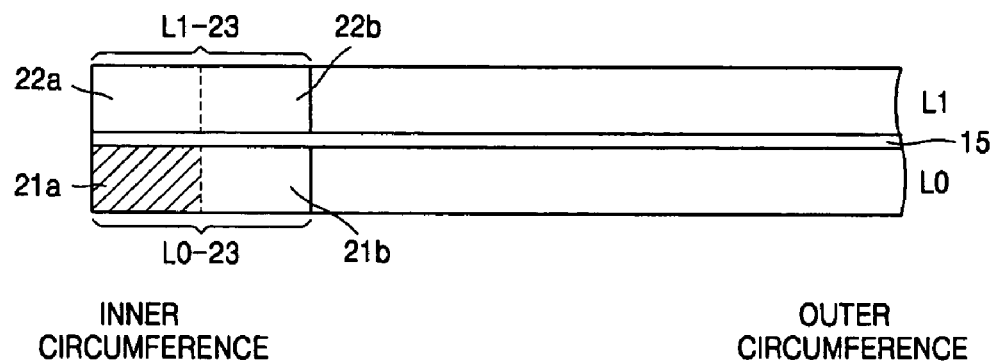
FIGS. 5A and 5B are layouts illustrating a method to perform a test on an information storage medium according to an embodiment of the present invention to determine an optimum recording power.

Referring to FIG. 5A, first and second recording layers L0 and L1 respectively include first and second OPC areas L0-23 and L1-23. A region 21b of the first recording layer L0 on which OPC is performed is not disposed opposite a region 22a of the second recording layer L1 on which OPC is performed. When a beam is incident through the first recording layer L0, data is prerecorded on a region 21a disposed directly below the region 22a before performing OPC on the second recording layer L1.

A region 22b of the second recording layer L1 disposed opposite the region 21b of the first recording layer L0 subjected to OPC may be allocated for a reserved area. For recording onto the region 21a of the first recording layer L0 through which a beam to perform OPC on the second recording layer L1 passes, a prerecording process may be performed during fabrication of a disk, or data may be recorded in a predefined manner on a predetermined region of the first recording layer L0 prior to recording of user data.

Figure 5B:
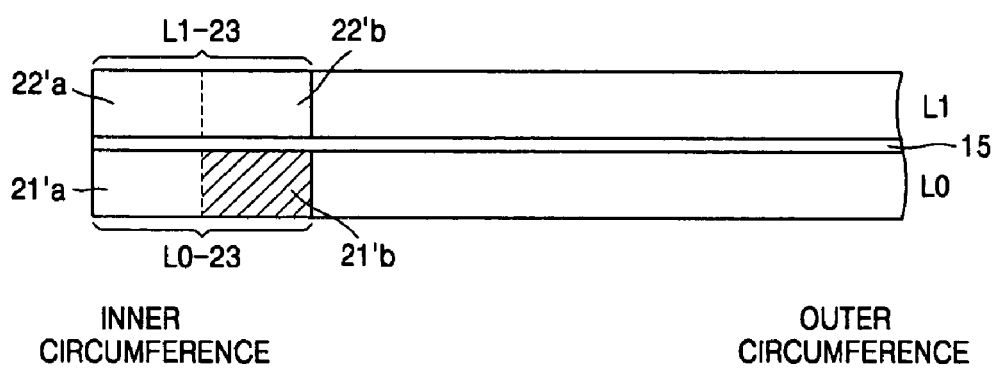

Referring to FIG. 5B, first and second recording layers L0 and L1 respectively include first and second OPC areas L0-23 and L1-23. While a region 21'a of the first recording layer L0 where OPC is performed is positioned on the inner circumference of the first OPC area L0-23, a region 22'b of the second recording layer L1 where OPC is performed is located on the outer circumference of the second OPC areas L1-23.

When a beam is incident through the first recording layer L0, data is prerecorded on a region 21'b disposed directly below the region 22'b before performing OPC on the second recording layer L1.

A region 22'a of the second recording layer L1 disposed opposite the region 21'a of the first recording layer L0 subjected to OPC may be a reserved area. The same recording mechanism may apply to the outer circumference of the information storage medium as well as the inner circumference.

Figure 6A:
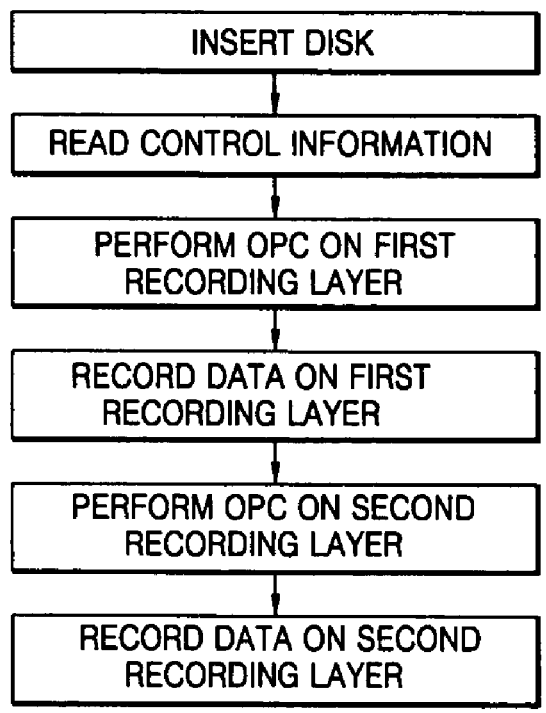
FIGS. 6A and 6B are flowcharts illustrating processes of performing OPC in a method to record/reproduce data on/from an information storage medium according to an embodiment of the present invention.

Referring to FIG. 6A, a method to perform OPC for each recording layer in an information storage medium having a plurality of recording layers includes performing OPC on a recording layer from the lowermost recording layer upward when the information storage medium is inserted into a drive, and recording user data on the same recording layer subjected to OPC before performing OPC on an overlying recording layer. In this case, after recording on a first recording layer, OPC is performed on a second recording layer. However, since the method allows user data to be input continuously during OPC for the second recording layer, a memory or buffer is required to store a predetermined amount of data until OPC is finished.

Figure 6B:
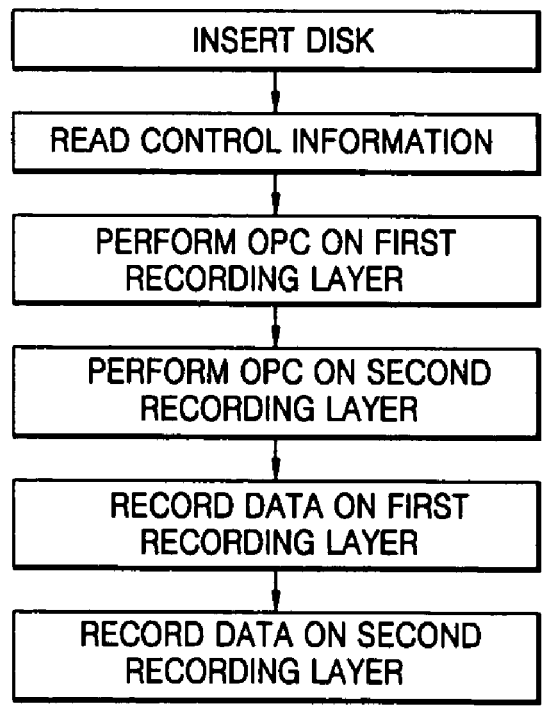

Referring to FIG. 6B, an alternative method to perform OPC for each recording layer includes sequentially performing OPC on each recording layer when the information storage medium is inserted into the drive, and sequentially recording data on each recording layer. This method does not require a memory or buffer and is advantageous in continuously recording data without interruption.

Referring to FIG. 2, an apparatus (i.e., a disk drive) to record/reproduce data on/from the information storage medium D according to an embodiment of the present invention includes a pickup 50, a recording/reproducing signal processor 60, and a controller 70. More specifically, the pickup 50 includes a laser diode 51 that emits a beam, a collimating lens 52 that collimates the beam emitted by the laser diode 51 to a parallel beam, a beam splitter 54 that changes the propagation path of an incident beam, and an objective lens 56 that focuses the beam passing through the beam splitter 54 onto the information storage medium D.

The beam reflected from the information storage medium D is reflected by the beam splitter 54 and is incident on the photodetector 57 (e.g., a quadrant photodetector). The beam received by the photodetector 57 is converted into an electrical signal by an operational circuit 58 and output as a RF or a sum signal through channel Ch1 and as a push-pull signal through a differential signal channel Ch2.

Before recording data on the information storage medium D having the first and second recording layers L1 and L2, the controller 70 performs a test on a test area in the information storage medium D to determine the optimum recording power. To achieve this function, after recording data on the first recording layer L1, the controller 70 detects whether data has been written on a portion of the first recording layer L1 irradiated by a test beam during an OPC test for the second recording layer L2 and controls the pickup 50 to record data on at least a portion of the first recording layer L1 through which the test beam passes before performing the test.

During the OPC test, the controller 70 also reads control information such as reflectivity, jitter, degree of modulation, or asymmetry through the pickup 50 and determines the optimum recording power using the control information. Then, the controller 70 allows a recording beam to be irradiated from the pickup 50 at normal power obtained during the test, so that data can be recorded on the information storage medium D using the recording beam.

To reproduce the thus recorded data, a beam reflected from the information storage medium D passes through the objective lens 56 and the beam splitter 54, and is incident on the photodetector 57. The beam input to the photodetector 57 is then converted into an electrical signal by the operational circuit 58 and output as an RF signal.

A drive according to another embodiment of the present invention may include OPC information on an information storage medium. For example, the OPC information may contain information on an effect on the OPC due to whether data has been recorded on a portion of the information storage medium through which a beam passes during OPC. The drive having such information eliminates a need to prerecord data on an area of the information storage medium through which a beam passes during OPC.

That is, in this embodiment, the drive having the OPC information does not require data to be recorded on an adjacent recording layer of the information storage medium before OPC. Recording data on the information storage medium for OPC, even in a drive having OPC information, may increase data recording time and reduce an OPC area due to data recording.

Thus, by providing predetermined information with a drive having OPC information, recording data on an adjacent recording layer for OPC is unnecessary. Therefore, by using the predetermined information, the drive may perform OPC accurately and quickly using embedded OPC information, even if data has not been written on a portion through which a beam for OPC passes.

For example, let a drive possessing OPC information representing an effect on the OPC due to whether data has been recorded on an area through which a beam for OPC passes be a drive A, let a drive having no such information be a drive B, and let the area irradiated with a beam for OPC be an area Y.

To record data on the information storage medium, the drive A reads disk related information before performing OPC. In this case, when information indicating that data has been written on the area Y through which a beam for OPC passes is not recorded on the information storage medium, the drive A performs OPC using its embedded OPC information without the need to record separate data on the area Y, thus saving time spent in recording data on the area Y. Conversely, when information indicating that data has been written on the area Y is recorded on a predetermined area of the information storage medium, the drive A performs OPC at recording power that is adjusted considering that data has been written on the area Y.

To record data on the information storage medium, the drive B reads disk related information and information written on a recordable region before performing OPC. In this case, when information indicating that data has been written on the area Y is not recorded on the information storage medium, the drive B first records data on the area Y of the information storage medium before performing OPC. When performing OPC, the drive B irradiates the area Y with an OPC beam and then records information indicating that data has been written on the area Y on a recordable region (e.g., an information zone) in a lead-in area or a lead-out area.

For example, to perform OPC on a second recording layer, information indicating whether data has been written on the area Y of a first recording layer may be recorded as follows, using a byte X in the information zone:

| Byte X: | |
|---|---|
| 0000 0000(00h) → | Not recorded |
| 0000 0001(01h) → | Recorded |

Meanwhile, information on whether OPC data has been written on inner or outer circumference of the OPC areas L0-23 and L1-23 as shown in FIGS. 5A and 5B may be recorded as follows, using X bytes:

| Byte X: | |
|---|---|
| 0000 0000(00h) → | Not recorded on inner and outer circumferences, |
| 0000 0001(01h) → | Not recorded on inner circumference, recorded on outer circumference |
| 0001 0000(10h) → | Recorded on inner circumference, not recorded on outer circumference |
| 0001 0001(11h) → | Recorded on inner and outer circumferences |

As described above, the first four bits of one byte represent information on the inner circumference, and the following 4 bits represent information on the outer circumference. Alternatively, either information may be recorded using two bytes.

Specifically, an information storage medium includes first and second recording layers L0 and L1, and data is recorded from the first recording layer L0 to the second recording layer L1. A pickup may be located below the first recording layer L0. A drive may use information on whether data has been separately written on an area through which a test beam for OPC passes in performing OPC to record on the second recording layer L1. If the information for OPC has not been written to the area, the drive may perform OPC using its embedded OPC information instead of separately recording OPC data.

The same method may be applied to a multi-layer information storage medium having three or more recording layers. In this case, when a recording layer being subjected to OPC is irradiated with a test beam, information indicating whether data has been written on an area through which the test beam passes is recorded on a predetermined region of the information storage medium, and OPC is performed on the plurality of recording layers using the same information.

Here, an OPC test zone may be disposed in an area other than a user data area. While FIGS. 3 and 4 illustrate that the lead-in area 20 contains the test zone, a test area may be positioned separately from lead-in and lead-out areas.

Meanwhile, when information indicating that data has been written on the area Y is recorded on a predetermined area of the information storage medium, the drive B performs OPC at recording power that is adjusted considering that data has been written on the area Y.

A drive according to an embodiment of the present invention controls the pickup 50 to read information concerning whether data has been written for OPC and perform OPC in a manner specific to the drive.

An information storage medium according to an embodiment of the present invention contains information indicating whether data has been recorded on an area through which a beam for OPC passes, thus making recording of separate data for OPC optional according to the type of a drive. A drive possessing OPC information performs OPC without a need to record separate data, thus reducing the recording time and increasing the utilization efficiency of an OPC area.

A method to record/reproduce data on/from the information storage medium according to an embodiment of the present invention enables determining an optimum reading power to record/reproduce data to/from a recordable information storage medium having a plurality of recording layers. The method requires a test to find the optimum recording power for recording, thus achieving effective recording/reproducing characteristics. The present invention allows data to be recorded/reproduced in an order of recording layers from closest to farthest from a pickup, thus providing a recordable information storage medium capable of achieving consistency with a DVD-ROM.

The present invention also provides an apparatus to record/reproduce data on the information storage medium to perform a test on a desired recording layer to find the optimum recording power.

The present invention also provides information on recording of data needed for OPC so as to select recording conditions for OPC according to a type of a drive, thus enabling more efficient OPC.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of reproducing data from an information storage medium, comprising reproducing data from recording layers of the information storage medium using a pickup, wherein the recording layers include the data recorded on a first of the recording layers on at least a portion through which a test beam to determine an optimum recording power is later passed to perform optimum power control (OPC) on a second of the recording layers, wherein the portion through which the test beam is passed is recordable and not an OPC region of the first of the recording layers, and is positioned to cover and face all of an OPC region of the second of the recording layers.

2. The method of claim 1, wherein the portion of the first recording layer corresponds to a number of tracks contained in the test beam as calculated by $$\text{Number of Tracks} = \frac{2SL\tan\left[\sin^{-1}\left(\frac{NA}{n}\right)\right]}{TP},$$

wherein SL denotes a thickness of a spacer layer between the first recording layer and the second recording layer, TP denotes a track pitch, NA denotes a numerical aperture of an objective lens, and n denotes a refractive index of the information storage medium, respectively.

3. The method of claim 1, wherein the data is recorded in an order of recording layers from closest to farthest from the pickup.

4. The method of claim 1, wherein, after recording the data on the first recording layer located closest to the pickup, OPC is performed on the second layer that is an overlying recording layer before recording data on the overlying recording layer.

5. The method of claim 1, wherein, before recording user data on the information storage medium, OPC is performed on the recording layers.

6. The method of claim 1, wherein the first recording layer is located closer to the pickup than the second recording layer, and the data is recorded on a portion of the first recording layer before OPC is performed on the second recording layer.

7. The method of claim 1, wherein control information to perform OPC is recorded on at least one of a lead-in area and a lead-out area in the information storage medium.

8. The method of claim 7, wherein the control information includes at least one of jitter, asymmetry, degree of modulation, or reflectivity.

9. The method of claim 8, wherein the control information is measured after recording data on the portion through which the test beam passed.

10. The method of claim 1, wherein information is recorded indicating that the data has been written on the portion through which the test beam is passed.

11. A reproducing apparatus, comprising:
a pickup to irradiate a laser beam onto an information storage medium, the information storage medium having a plurality of recording layers; and
a controller to control the pickup to irradiate the laser beam to reproduce data from the plurality of recording layers, the plurality of recording layers including the data which has been recorded on one of the plurality of recording layers at a portion through which a test beam is later passed to determine an optimum recording power to perform optimum power control (OPC) on a desired recording layer, the passing of the test beam being performed prior to performing the OPC on the desired recording layer, wherein the portion through which the test beam is later passed is recordable and not an OPC region of the one of the plurality of recording layers, and is positioned to cover and face all of an OPC region of the desired recording layer.

12. A reproducing apparatus, comprising:
a pickup irradiating a laser beam onto an information storage medium, the information storage medium including first and second recording layers; and
a controller controlling the pickup to irradiate the beam to reproduce data from the first and second recording layers, wherein the first recording layer comprises a first optimum power control (OPC) area, the second recording layer comprises a second OPC area, the data being recorded on a first region within the inner or outer circumference of the first OPC area, and OPC being previously performed on a second region of the second OPC area that is disposed within the opposite circumference from that of the first region of the first OPC after the data has been recorded on the first region to determine an optimum recording power.

13. The apparatus of claim 12, wherein each of the first and second OPC areas is positioned separately from lead-in areas and lead-out areas of the first and second recording layers.

14. A reproducing apparatus, comprising:
- a pickup to irradiate a laser beam onto an information storage medium, the information storage medium having a plurality of recording layers; and
- a controller to control the pickup to irradiate the laser beam and to reproduce data from the plurality of recording layers, wherein the plurality of recording layers store optimum power control (OPC) information indicating whether data has been written on a recording layer at a portion through which a test beam is later passed to determine an optimum recording power to record on a desired one of the recording layers, wherein the portion through which the test beam is later passed is recordable and not an OPC region of the plurality of recording layers, and is positioned to cover and face all of an OPC region of the desired one of the recording layers.

15. The apparatus of claim 14, wherein each of the plurality of recording layers have an OPC area, and the OPC information includes information indicating whether the data has been written on an inner or an outer circumference of the OPC area through which the test beam is later passed.

16. The apparatus of claim 14, wherein each of the plurality of recording layers comprises a lead-in area, a user data area, and a lead-out area, and the OPC information is recorded on at least one of the lead-in areas and/or the lead-out areas.

17. The apparatus of claim 16, wherein one of the lead-in areas comprises a read-only region and a recordable region, and the OPC information is recorded on the recordable region.

* * * * *